US007219212B1

(12) United States Patent
Sanghavi et al.

(10) Patent No.: US 7,219,212 B1
(45) Date of Patent: May 15, 2007

(54) LOAD/STORE OPERATION OF MEMORY MISALIGNED VECTOR DATA USING ALIGNMENT REGISTER STORING REALIGNED DATA PORTION FOR COMBINING WITH REMAINING PORTION

(75) Inventors: Himanshu A. Sanghavi, Fremont, CA (US); Earl A. Killian, Los Altos Hills, CA (US); James Robert Kennedy, Boulder Creek, CA (US); Darin S. Petkov, Hayward, CA (US); Peng Tu, San Ramon, CA (US); William A. Huffman, Los Gatos, CA (US)

(73) Assignee: Tensilica, Inc., Santa Clara, CA (US)

( * ) Notice: Subject to any disclaimer, the term of this patent is extended or adjusted under 35 U.S.C. 154(b) by 181 days.

(21) Appl. No.: 11/067,106

(22) Filed: Feb. 25, 2005

Related U.S. Application Data

(62) Division of application No. 10/145,380, filed on May 13, 2002.

(51) Int. Cl.
G06F 9/315 (2006.01)
(52) U.S. Cl. .............................. 712/6; 712/4; 712/225
(58) Field of Classification Search ..................... None
See application file for complete search history.

(56) References Cited

U.S. PATENT DOCUMENTS

| | | | | |
|---|---|---|---|---|
| 5,222,225 A * | 6/1993 | Groves | .......................... | 710/22 |
| 5,802,556 A * | 9/1998 | Patel et al. | .................. | 711/109 |
| 5,922,066 A * | 7/1999 | Cho et al. | .................... | 712/204 |
| 6,058,465 A | 5/2000 | Nguyen | .......................... | 712/7 |
| 6,366,998 B1 | 4/2002 | Mohamed | .................... | 712/17 |
| 6,549,999 B2 | 4/2003 | Kishida | ...................... | 712/210 |
| 6,704,859 B1 | 3/2004 | Jacobs | ......................... | 712/237 |
| 6,721,866 B2 * | 4/2004 | Roussel et al. | ............. | 711/201 |
| 6,820,195 B1 * | 11/2004 | Shepherd | .................... | 712/300 |
| 2003/0014457 A1 | 1/2003 | Desai | ........................ | 708/520 |

FOREIGN PATENT DOCUMENTS

WO    WO 00/46704    8/2000
WO    WO 01/61576    8/2001

OTHER PUBLICATIONS

Vert, William Dr., "An Essay on Endian Order", *Dr. Bill's Notes on Little Endian vs. Big Engian*, at web site cs.umass.edu/~verts/cs32/endian.html, Apr. 19, 1996.

* cited by examiner

*Primary Examiner*—Kenneth S. Kim
(74) *Attorney, Agent, or Firm*—Pillsbury Winthrop et al.

(57) ABSTRACT

A processor can achieve high code density while allowing higher performance than existing architectures, particularly for Digital Signal Processing (DSP) applications. In accordance with one aspect, the processor supports three possible instruction sizes while maintaining the simplicity of programming and allowing efficient physical implementation. Most of the application code can be encoded using two sets of narrow size instructions to achieve high code density. Adding a third (and larger, i.e. VLIW) instruction size allows the architecture to encode multiple operations per instruction for the performance critical section of the code. Further, each operation of the VLIW format instruction can optionally be a SIMD operation that operates upon vector data. A scheme for the optimal utilization (highest achievable performance for the given amount of hardware) of multiply-accumulate (MAC) hardware is also provided.

8 Claims, 8 Drawing Sheets

Sixteen 8-bit elements in memory

LVS16.I (load eight 16-bit elements)

Sixteen 8-bit elements in a single vector register

LEXP8S (load expand)

Sixteen 20-bit elements in two vector registers

Complex Multiply

| | | | | | | | | |
|---|---|---|---|---|---|---|---|---|
| Operand 0 | $a_3$ | $b_3$ | $a_2$ | $b_2$ | $a_1$ | $b_1$ | $a_0$ | $b_0$ |
| Operand 1 | $c_3$ | $d_3$ | $c_2$ | $d_2$ | $c_1$ | $d_1$ | $c_0$ | $d_0$ |
| Real product | $a_3c_3 - b_3d_3$ | | $a_2c_2 - b_2d_2$ | | $a_1c_1 - b_1d_1$ | | $a_0c_0 - b_0d_0$ | |
| Imaginary product | $a_3d_3 + b_3c_3$ | | $a_2d_2 + b_2c_2$ | | $a_1d_1 + b_1c_1$ | | $a_0d_0 + b_0c_0$ | |

FIG. 10

LOAD/STORE OPERATION OF MEMORY MISALIGNED VECTOR DATA USING ALIGNMENT REGISTER STORING REALIGNED DATA PORTION FOR COMBINING WITH REMAINING PORTION

CROSS-REFERENCE TO RELATED APPLICATIONS

The present application is a divisional application of U.S. application Ser. No. 10/145,380 filed on May 13, 2002 which is related to U.S. application Ser. No. 10/146,651 and U.S. application Ser. No. 10/146,655, both filed on May 13, 2002, the contents of which are incorporated herein by reference.

FIELD OF THE INVENTION

The present invention relates generally to microprocessor systems, and more particularly, microprocessor systems that perform very large number of operations per unit of time but also reduce the size of machine code to represent the program.

BACKGROUND OF THE INVENTION

New application-focused system-on-chip platforms motivate new application-specific processors. Configurable and extensible processor architectures offer the efficiency of tuned logic solutions with the flexibility of standard high-level programming methodology. Automated extension of processor function units and the associated software environment (compilers, debuggers, simulators and real-time operating systems) satisfies these needs. At the same time, designing at the level of software and instruction set architecture significantly shortens the design cycle and reduces verification effort and risk.

U.S. Pat. No. 6,282,633, issued Aug. 28, 2001 and entitled, "High Data Density RISC Processor," U.S. application Ser. No. 09/246,047, filed Feb. 5, 1999 and entitled "Automated Processor Generation System for Designing a Configurable Processor and Software," U.S. application Ser. No. 09/322,735, filed May 28, 1999 and entitled "System for Adding Complex Instruction Extensions to a Microprocessor," and U.S. application Ser. No. 09/506,502, filed Feb. 17, 2000 and entitled "Improved Automated Processor Generation System for Designing a Configurable Processor and Software," all commonly owned by the present assignee and incorporated herein by reference, dramatically advanced the state of the art of microprocessor architecture and design.

More particularly, these previous patents and applications described in detail a high-performance RISC processor, as well as a system that is able to generate a customized version of such a high-performance RISC processor based on user specifications (e.g. number of interrupts, width of processor interface, size of instruction/data cache, inclusion of MAC or multiplier) and implementation goals (e.g. target ASIC technology, speed, gate count, power dissipation, and prioritization among these goals). The system generates a Register Transfer Level (RTL) representation of the processor, along with the software tools for the processor (compiler, linker, assembler, debugger, simulator, profiler, etc.), and the set of scripts to transform the RTL representation into a manufacturable geometric representation (GDS II format files). The system further includes recursive evaluation tools that allow for the addition of processor extensions to provide hardware support for commonly used functions in accordance with the application to achieve an ideal trade-off between software flexibility and hardware performance.

Generally, as shown in FIG. 1, the processor 102 generated by the system can include a configurable core 104 that is substantially the processor described in U.S. Pat. No. 6,282,633, and an optional set of application-specific processor extensions 106, which extensions may be described by Tensilica Instruction Extension (TIE) language instructions, and/or other high level hardware description language instructions, as detailed in the above-referenced applications. The processor and generation system of the above-referenced patents and applications are embodied in products that are commercially available from Tensilica, Inc. of Santa Clara, Calif.

According to one aspect, U.S. Pat. No. 6,282,633 achieves high performance computing by making efficient use of instruction encoding to reduce program storage. As described therein, processor architecture is a well known art. As such, most features in instruction set design are not new in themselves. However, when optimizing a system for different target applications, it is possible to combine features in a novel way that results in significant improvements in performance, code size, and power dissipation.

Instruction set design must balance many conflicting requirements. Most processor systems seek to reduce the total execution time of an application (or a mixture of applications). Total execution time can be computed from the following equation, $$T=IE*CPI*CP$$

where IE is the total dynamic instruction count required to execute the program, CPI is the average number of clocks per instruction, and CP is the time for each clock. Instruction set design seeks to reduce IE while at the same time allowing for efficient implementations that can reduce CPI and CP. Implementations that seek to minimize CPI and CP can be simply referred to as efficient.

One technique commonly used to reduce IE is to have each instruction operate on various pieces of data simultaneously—a technique often described as Single Instruction Multiple Data (SIMD) or vector processing. To allow efficient software implementations data elements that do not depend on each other and that are computed in similar ways must be identified, as this allows those elements to be computed in parallel.

Another technique used to increase performance is to allow the processor to execute more than one instruction per cycle (i.e. Instruction Level Parallelism (ILP)). There are broadly two different ways to achieve this. One is to explicitly encode multiple independent operations in one instruction. The second is to dynamically determine which operations can be executed in parallel in the processor and schedule them accordingly (i.e., out-of-order).

Some machines have used both SIMD and ILP techniques. The IA64 architecture from Intel Corp. of Santa Clara, Calif., for example, can encode up to three operations per instruction. Furthermore, each of these operations can operate on a vector of data. In order to encode this information into an instruction, these architectures normally use very long instruction words (VLIW). Although VLIW provides certain advantages, one big disadvantage of known VLIW machines is wasted code storage space. For example, in most fixed length VLIW machines (such as the IA64), all instructions must be encoded using the same fixed long instruction word format, even if there are not enough operations to execute in a given cycle.

A rule of thumb often quoted in the processor architecture community is that 10% of the static instructions are responsible for 90% of the execution time. This is because often applications, particularly those including digital signal processing (DSP) algorithms, have loops (or kernels) that do most of the work processing data. It is this 10% of the instructions that must be sped up to significantly reduce total execution time. The other 90% of the instructions, however, can be encoded more efficiently to reduce instruction count, and thus the storage required for the program.

The processor of U.S. Pat. No. 6,282,633 can very efficiently encode programs and can be implemented efficiently so as to minimize CPI and CP. However, in some applications it is still not possible to encode enough operations into a single instruction. It thus remains desirable to extend the instruction set architecture even further to allow the 10% of the instructions that account for 90% of the execution time to express more parallelism, particularly in DSP applications.

SUMMARY OF THE INVENTION

The present invention provides a processor that can achieve high code density but allows higher performance than existing architectures. In accordance with one aspect of the invention, instructions can be extended to three possible sizes while maintaining the simplicity of decoding to allow efficient processor implementations. Adding a third (and larger, i.e. VLIW) instruction size allows the architecture to encode multiple operations per instruction, where each operation can optionally be a vector operation. According to another aspect of the invention, new operations that can significantly reduce the dynamic instruction count for common DSP application kernels, such as Fast Fourier Transform (FFT), Finite Impulse Response (FIR) filtering, and Least Mean Square (LMS) adaptive filtering are provided. These new operations allow kernels to be encoded more efficiently and to make better use of the processor resources.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 10 is a diagram illustrating vector processor support for complex multiply operations.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration. The attached appendices form part of the present disclosure and are incorporated herein by reference.

Figure 1:
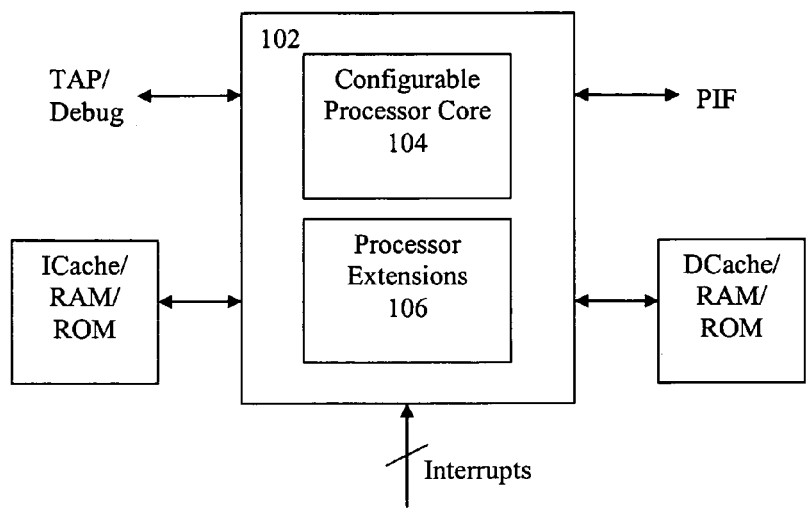
FIG. 1 is a block diagram illustrating a configurable and extensible processor architecture on which the present invention can be based.
Figure 2:
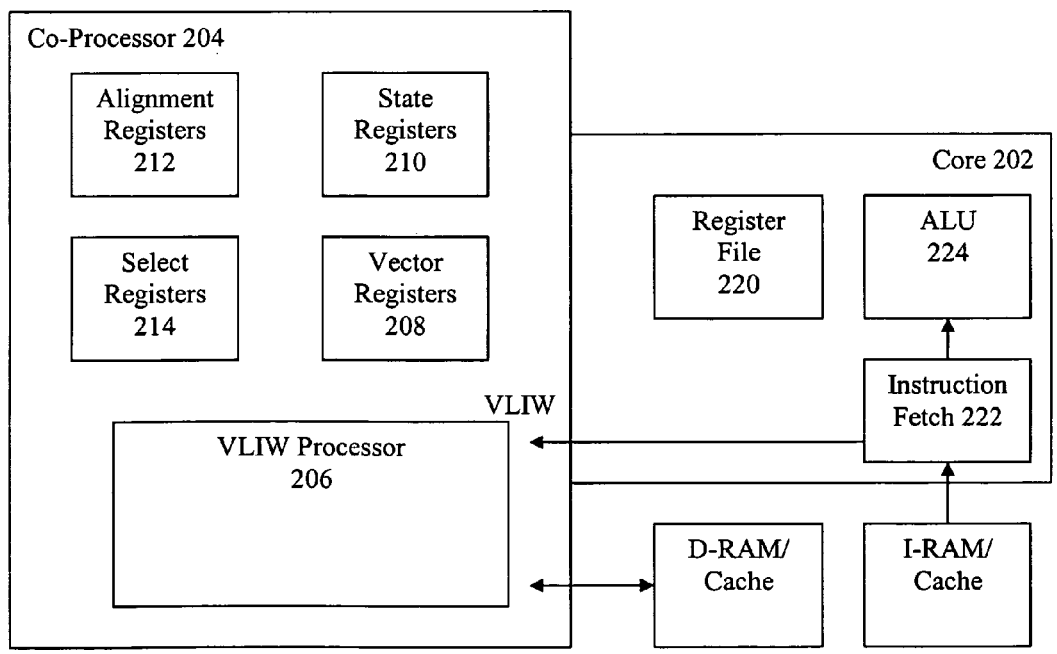
FIG. 2 is a block diagram of a processor including a co-processor according to the present invention.

FIG. 2 is a top-level diagram illustrating an example implementation of the invention. As shown in FIG. 2, the processor of the present invention includes a processor core 202 and a vector functional unit (i.e. vector co-processor) 204. In one example, processor core 202 is implemented by a high performance RISC processor such as that described in U.S. Pat. No. 6,282,633, with improvements and enhancements as provided in co-pending application Ser. Nos. 10/146,651 and 10/146,655. As will become more apparent from the descriptions below, while the processor of U.S. Pat. No. 6,282,633 allowed for up to two different instruction sizes (16- and 24-bits, for example), the processor of the present invention allows for three instruction sizes, with the third and largest (VLIW) instruction size (e.g. 64-bits) being provided for execution by co-processor 204.

Co-processor 204 includes vector processing and VLIW capabilities that are new in the art and are implemented by, for example, TIE and extensibility features such as those described in the processor generation system of the prior patent applications, as well as additional processor extensibility and configurability improvements provided in co-pending applications Ser. No. 10/146,651 and Ser. No. 10/146,655. In one example embodiment, co-processor 204 can perform up to three vector operations in every instruction. Although the capability of performing vector operations can be found in previous processor architectures, the combination of features of co-processor 204 of the present invention is rather unique, as will become more apparent from the descriptions below. Such features include, for example, the ability to efficiently code most of the non-performance critical code in compact 16/24-bit format, while allowing VLIW instructions for the processor-intensive application kernels.

In accordance with an aspect of the invention, co-processor 204 includes a VLIW processor 206. In one example, the VLIW processor executes a 64-bit wide instruction that can combine up to three operations per instruction. Further in accordance with the principles of the invention, co-processor 204 is a Single Instruction Multiple Data (SIMD) processor, in which each operation operates on a "vector" data operand from vector registers 208. The vector data operand can include a configurable number of scalar operands, all of which get processed by the same instruction. In one example implementation, a vector consists of eight scalar data elements. The combination of VLIW and SIMD processing techniques on this processor provides a significantly higher level of performance compared to DSP processors that use only one (or none) of these techniques.

Figure 3:
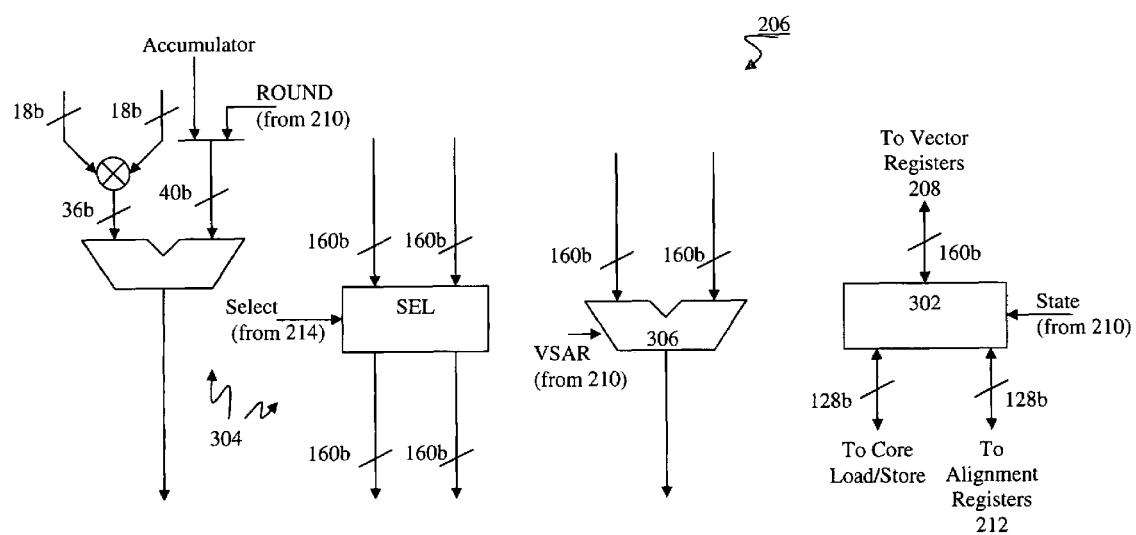
FIG. 3 illustrates a VLIW processor that can be included in a co-processor in accordance with an aspect of the invention.

FIG. 3 illustrates one possible example of VLIW processor 206 in further detail. As shown in FIG. 3, unit 206 includes a co-processor load/store unit 302 that executes load/store operations from/to memory, possibly in conjunction with a core processor load/store unit, and further in accordance with values in state registers 210 (e.g. CBEGIN and CEND) and alignment registers 212, a MAC/select unit 304 for performing multiply/accumulate operations and selection operations, possibly in accordance with values in select registers 214, an ALU/Shift unit 306 for performing arithmetic/logic and shift operations, possibly in accordance with values in state registers 210 (VSAR). It should be noted that MAC unit 304 is shown as only including one multiplier, it can contain several, and in an example embodiment described in detail below, it includes four multipliers. The implementation details of the basic load/store functionality of processor 206 can be found in co-pending application Ser. No. 10/146,651, and so such details will not be repeated here so as not to obscure the present invention. The implementation details of additional functionalities of processor 206 will become apparent from the descriptions provided herein, with appropriate references to the co-pending applications and appendices that are incorporated herein. According to one aspect of the invention, such functionalities of units 302, 304 and 306 are implemented by adding co-processor instructions that are described using TIE language extensions, which language and extensions are detailed in the prior and co-pending applications, and will be described in more detail below.

Figure 4:
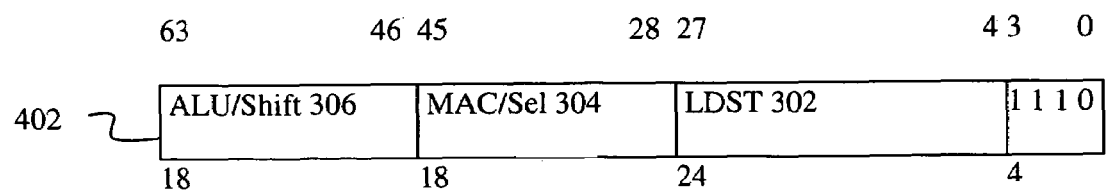
FIG. 4 illustrates an example structure of a VLIW that can be used in the co-processor of the present invention.

In one possible example implementation of co-processor 204, a 64-bit instruction word is coded to specify three independent operations. It should be noted that other large instruction sizes and number of independent operations is a design choice, and so the invention is not limited to these selections. The general format of a 64-bit/3 operation example of a co-processor instruction word is shown in FIG. 4. As shown in the example of FIG. 4, when the least significant four bits of the instruction take the decimal value 14, this corresponds to the instruction space used to define the co-processor instructions.

Once bits [3:0] of an instruction are decoded by instruction fetch unit 222 to indicate a co-processor instruction, the remaining bits are interpreted to execute in co-processor 204 as follows:

The next 24 bits of the instruction word (bits [27:4]) define the first instruction slot, which contains a co-processor load/store instructions for unit 302.

The next 18 bits of the instruction word (bits [45:28]) define the second instruction slot, which contains the Multiply-Accumulate (MAC) instructions for MAC unit 304 (as well as certain select instructions, in conjunction with an advantageous implementation of the invention as will be described in more detail below).

The final 18 bits (bits [63:46]) define the third instruction slot, which contains the ALU and shift instructions for ALU unit 306.

Details of one example of how VLIW instructions with separate instruction slots as described above can be added in the processor architecture of U.S. Pat. No. 6,282,633 and the prior patent applications are provided in co-pending application Ser. No. 10/146,655. From those descriptions, as well as the examples provided herein, those skilled in the art will be able to practice the invention with different VLIW bit sizes and numbers of instruction slots per VLIW instruction.

Referring back to FIG. 2, co-processor 204 further includes alignment registers 212, state registers 210 and select registers 214. An example implementation of the state registers 210 and three register files 208, 212 and 214 are summarized in TABLE 1 below.

TABLE 1

| Name | Size | Function |
| --- | --- | --- |
| State | | |
| - VSAR | 5 bits | Vector Shift Amount Register |
| - ROUND | 40 bits | Rounding value |
| - CBEGIN, CEND | 32 bits each | Virtual address registers for circular buffer support |
| Vector | 16 × 160 bits | General purpose register file |
| Alignment | 4 × 128 bits | Register file to accelerate unaligned loads and stores |
| Select | 8 × 64 bits | Vector SEL and DSEL control values |

As shown in TABLE 1, an example implementation of state registers 210 includes a VSAR register, a ROUND register, a CBEGIN register and a CEND register. The VSAR state register is a 5-bit register that specifies the shift amount for variable shift operations. The ROUND state register is a 40-bit register that stores a rounding value that is typically added to a data element stored in a higher precision format before it is converted into a lower precision format. CBEGIN and CEND are both 32-bit registers that store the beginning and end address of a circular buffer in memory. These registers are used in conjunction with special co-processor load and store instructions that provide automatic wrap around of addresses at the circular buffer boundary.

In this example embodiment, the vector register file 208 includes sixteen 160-bit registers. These are the operand registers for all the co-processor data processing instructions. Load instructions read data from memory into these registers and store instructions write the contents of these registers to memory. This register file has six read and three write ports as shown below in TABLE 2. Of these ports, one read and two write ports (indicated with an asterisk in the table) are paired read/write ports. A paired read port is one that can read two adjacent registers in one access and a paired write port can write two such registers in one access. These ports are used for certain instructions (such as the multiply instruction) that have operands spanning two registers.

The alignment register file 212 is a special purpose register file used to accelerate the loading and storing of unaligned data to/from the general purpose register file, as will be described in more detail below. There are four registers in this file, each of which is 128-bits wide. The alignment register file has one read and one write port.

The select register file 214 is a special purpose register file used in conjunction with the select (SEL) and dual select (DSEL) instructions. These instructions rearrange the data from the source vector registers into the destination vector register, as will be described in more detail below. The select register file specifies the selection control values for this rearrangement. There are eight registers in this file, each of which is 64-bits wide. The select register file has two read ports and one write port.

TABLE 2 below summarizes the number of read and write ports between the various register files and the different units in each unit 206 according to one example implementation.

TABLE 2

|  | VEC 208 | ALIGN 212 | SEL 214 |
| --- | --- | --- | --- |
| LDST 302 | 1r, 1w | 1r, 1w | 1r, 1w |
| MAC 304 | 3r*, 1w* | 0r, 0w | 1r, 0w |
| ALU 306 | 2r, 1w* | 0r, 0w | 0r, 0w |
| Total | 6r, 3w | 1r, 1w | 2r, 1w |

In a preferred implementation, co-processor 204 processes fixed point data. For example, the basic data element (i.e. a scalar) can be 16 bits wide, and a vector can consist of 8 such elements. Thus an input vector in memory is assumed to be 128-bits wide. Co-processor 204 can also support a wider data type that is twice the width of the basic data type i.e. 32-bits, and thus there are four such elements (i.e. scalars) in a vector. This double width data type can be generated as a result of multiply or multiply/accumulate operations on the narrow data type, as will become more apparent from the descriptions below.

Figure 5:
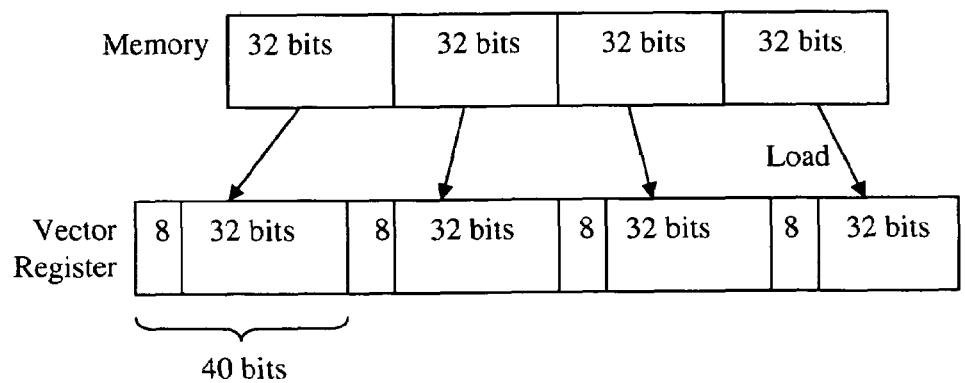
FIG. 5 illustrates an example of how an input vector in memory can be loaded into a vector register according to one aspect of the invention.

According to one aspect of the invention, as shown in FIG. 5, when a 128-bit vector is loaded from memory into one of vector registers 208, it is expanded to 160-bits. The 32 extra guard bits provide higher precision for intermediate results of computations. For example, during a load operation, a 16-bit scalar in memory is expanded to occupy 20-bits in the register, and a 32-bit scalar from memory is expanded to 40-bits. Co-processor 204 can support both signed and unsigned data types, and provides a symmetrical set of load and store instructions for both these data types. For signed data, a load results in sign extension from 16 to 20 (or 32 to 40) bits, whereas for unsigned data the load results in zero extension. A store operation results in saturation of data if the register value is beyond the range of values that can be represented in memory. Because of the presence of guard bits and the semantics of the load and store instructions, the data processing instructions of co-processor 204 (such as the ALU and MAC instructions) all treat the data as signed. This allows the co-processor to correctly process unsigned data as long as there is no overflow into the most significant bit of the elements of a vector register. It thus becomes the responsibility of the programmer to ensure that the input data is scaled appropriately to prevent such an overflow when processing unsigned numbers. Those skilled in the art will note that this problem is similar to the general problem of preventing overflows in any fixed point processor.

It should be noted that a large number of DSP algorithms use 16-bit, fixed point data. However, in some situations, the input and output data may be specified with only 8 bits of precision, but the computation needs to be done with 16-bit or more precision. This allows for a higher dynamic range for intermediate results, which improves the accuracy of the computation. In order to facilitate this requirement, the co-processor 204 of the invention supports loading of 8-bit data into a vector register, and then in a single instruction, sign extend (or zero extend) this data to 20-bits and store the results into two vector registers. This is done immediately following a load and before any computation is performed. Similarly, after all the computations have been performed (in 20-bit precision), a single instruction takes data values from two vector registers, saturates the data values to 8-bit precision and stores the result in a single vector register. This operation is performed as the last step of the computation, just before the results are stored to memory.

Figure 8:
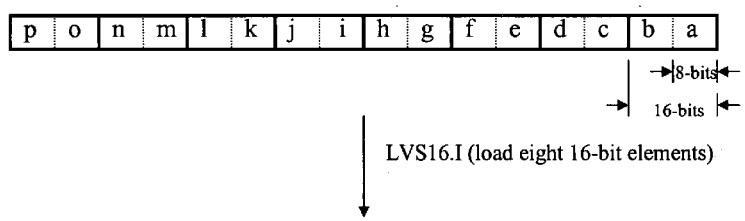
FIG. 8 is a diagram illustrating vector processor support for 8-bit data types.
Figure 8:
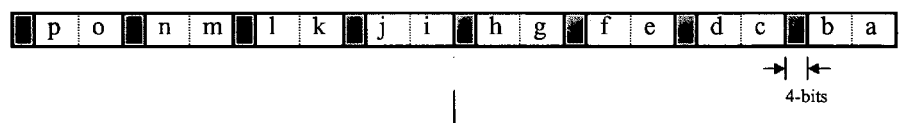
Figure 8:
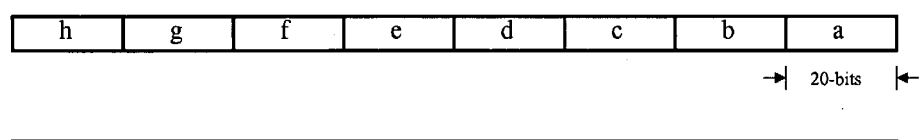

In accordance with the above, co-processor 204 includes special instructions (LEXP8S/LEXP8U, an example of which is attached as Appendix A) that are used to sign extend or zero extend each 8-bit value into a 20 bit value, and the result is stored in two adjacent vector registers. All subsequent processing inside of co-processor 204 then happens on the 20-bit representation. These operations are illustrated in FIG. 8. Finally, other special instructions (PACK20S/PACK20U) can be issued to convert this 20-bit data from the two vector registers into 8-bit data in a single vector register before it is written out to memory.

The aspects of the alignment registers 212 in accordance with the invention will now be described in more detail. In particular, a vector processing engine preferably includes means to efficiently load and store vectors of data from/to memory. In many cases, however, this is complicated by the fact that the data in memory is not aligned to the size of the vector. Loading and storing of such "unaligned" data from/ to memory is generally inefficient. For example, in a memory comprised of a fixed word size, desired vector data of the fixed word size may exist at an offset from the word boundaries, such that the desired data exists in two adjacent locations in the memory. Thus, in order to load the desired vector from memory, first the data must be loaded from the two adjacent memory locations into two different processor registers, then a subsequent select instruction must be performed to extract the correct data into a single register.

According to one aspect, the co-processor architecture of the present invention provides an efficient mechanism for accessing unaligned data in memory. This is done through the use of alignment registers 212 and a set of load and store instructions that in the steady state provide a throughput of one unaligned load/store per instruction. The design of these unaligned load/store instructions is such that the same instruction sequence can be used to access the data, whether the data is aligned or unaligned (to the vector size) in memory. It is thus not necessary to check for alignment before initiating such load and store instructions. This reduces code size and improves runtime performance. Another very important advantage of this design is that it can be used in situations where the alignment of the data in memory is not known a priori—the code sequence works in either case.

In the example design set forth above, each "vector" consists of eight 16-bit elements. A single 16-bit element will be referred to as a scalar, while the set of eight consecutive 16-bit elements are referred to as a vector. The scalar size is 16-bits or 2 bytes, and the vector size is 128-bits or 16 bytes. A vector that is stored in memory is considered to be "aligned" if its start address (in bytes) satisfies the condition "address modulo 16=0". Thus vectors stored at byte address 0, 16, 32, 48, 64, 96, 128 etc. are said to be aligned. Given a 128-bit or 16 byte wide interface to memory, such a vector can be loaded from memory into the processor register in a single memory access.

Figure 6:
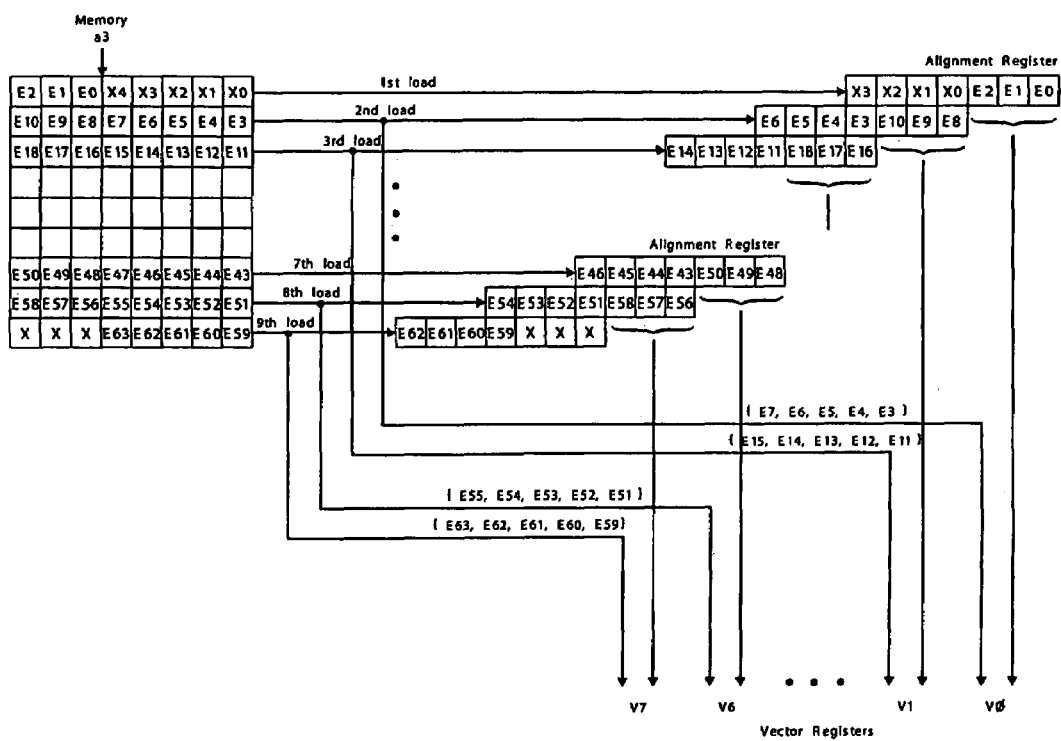
FIG. 6 is a diagram illustrating features of the alignment registers of the co-processor in accordance with an aspect of the invention.

Consider the problem of loading an unaligned vector from memory. As shown in FIG. 6, refer to elements E0–E7, E8–E15 etc., each of which represents a vector that is not aligned in memory. The following illustrates how an unaligned load operation is performed using the architecture of the present invention in a more optimal fashion. The processor initiates a vector load from the address corresponding to element E0. Data will always be supplied from an aligned memory address, so the processor reads the values {E2, E1, E0, X4, X3, X2, X1, X0}. However, the load/store unit of processor core 202 includes special logic in the load data path that detects the fact that the load was initiated on the address corresponding to E0, and not to the aligned address corresponding to X0. This logic then rotates the data so that the data coming into co-processor 204 is now {X4, X3, X2, X1, X0, E2, E1, E0}. This data is loaded into the alignment register, which is a special "temporary store" for such data. In one embodiment of the current invention, the alignment registers are only 112 bits wide, and hence the values {X3, X2, X1, X0, E2, E1, E0} are stored in the register while the value X4 is discarded. The next vector load is initiated from the address corresponding to element E8, which is the address of element E0 incremented by the vector size (16 bytes). This load reads the values {E10, E9, E8, E7, E6, E5, E4, E3} from memory, which gets rotated to become {E7, E6, E5, E4, E3, E1, E9, E8}. At this time, the logic in unit 302 will combine the values E7–E3 of the load data bus, with values E2–E0 from the alignment register to form the vector {E7, E6, E5, E4, E3, E2, E1, E0} and write this value into vector register file 208. At the same time, the alignment register is also updated with values {E6, E5, E4, E3, E10, E9, E8}. In the very next cycle, one could load E15–E11 from memory, combine it with E10–E8 from the alignment register and end up with E15–E8 in another vector register. Thus, if loading an array of vectors, one is able to perform an unaligned load every clock cycle. The only overhead was the very first load which is called the "priming load" since it is used to initialize the alignment register, or for "priming the pipeline."

Provided below is an example code sequence that could be used to load an array of unaligned vectors from memory:

```
LVS16A.IU v0, u0, a3, 16      // Prime alignment register u0
LOOP    a4, .Loopend          // Execute loop code a4 times
    LVS16A.IU v0, u0, a3, 16  // v0 <- next unaligned vector
    ...                       // Code to process loaded data
    ...                       // Code to store computed results
.Loopend:
```

TIE code for implementing an example unaligned load instruction such as LVS16A.IU is provided in Appendix B.

In this instruction, v0 represents the vector register into which the unaligned vector is loaded, and u0 represents the alignment register to be used. The operand a3 represents the address register, and 16 is the offset value that gets added to the address register (a3) to form the final address for the load. Note that the instruction uses the "auto increment" addressing mode which means that address register a3 is automatically updated to point to the next vector in memory on completion of the load. Note also that this example program code uses a hardware loop construct such as that described in U.S. Pat. No. 6,282,633.

It was mentioned that in one embodiment of the present invention, alignment register 212 is only 112-bits wide, even though the data we load from memory is 128 bits. It may be noted from FIG. 6 that only elements E2–E0, E10–E8 etc. of the alignment register are being used, and the rest of the elements are discarded. For an 8-element vector, the address can be unaligned by a maximum of 7-elements, and this is the maximum number of elements that would be used from the alignment register. Thus, in order to save hardware cost, the alignment register is designed to be only 7-elements, or 112 bits wide.

It should be noted that the code sequence shown above only works when the address (in address register a3) is known to be unaligned. Specifically, the code will load the incorrect vector values if the address is aligned to a 16-byte boundary. The problem is that the first unaligned load instruction (which is outside the loop) should only be executed if the address is unaligned. Thus in a situation where the alignment of the address is not known a priori, the updated code sequence would be as follows:

```
EXTUI   a8, a3, 0, 4          // Extract least significant 4
                              // bits of address into a8.
BEQZ    a8, .Laladdr          // If (a8==0) address is aligned to
                              // vector boundary, so branch.
LVS16A.IU v0, u0, a3, 16      // Address is not aligned, so prime
                              // the alignment register.
.Laladdr:
LOOP    a4, .Loop_end
    LVS16A.IU v0, u0, a3, 16
    ...
    ...
.Loop_end:
```

In the above code sequence, the first two instructions check if the address is aligned to a 16-byte boundary. If the address is aligned, a branch to the label Laladdr is made and the priming load instruction is skipped; otherwise the priming instruction is executed. The rest of the code remains the same as in the previous example.

In software applications and application libraries written in high level programming languages such as C and C++, it is common practice to pass data through memory pointers. In most such situations, the compiler cannot determine if the memory address pointers are aligned or not. As shown in the example code above, under these circumstances one will need to execute the two additional instructions and potentially suffer a branch penalty.

An aspect of the present invention is providing an innovative technique to address the above problem. Consider a special priming load instruction that is slightly different from the LVS16A.IU instruction described above. This instruction, LVA.P, takes only two input operands—an alignment register (u0, for example) and an address register (a3, for example). If the address in the address register is not aligned to a 16-byte boundary, the instruction serves the same purpose as the first LVS16A.IU instruction in the above code. It initializes the alignment register and increments the address register to point to the next vector in memory. If on the other hand the address is aligned to a 16-byte boundary, this instruction would do nothing—thus it would be the equivalent of branching over the LVS16A.IU instruction. The unaligned load code can now be rewritten as follows:

```
LVA.P   u0, a3                // Special priming load
LOOP    a4, .Loop_end
    LVS16A.IU v0, u0, a3, 16  // Regular unaligned load
    ...
    ...
.Loop_end:
```

The special priming load instruction thus allows generation of more compact code, and also avoid a branch penalty. This is especially useful for code generated by a compiler, where the alignment of the address may not be known a priori. The priming load instruction is even more useful when it itself is inside a loop i.e. it needs to be executed repeatedly.

The problem of storing unaligned vectors to memory will now be described in more detail. With reference to FIG. 6, consider vector register v0 which contains {E7', E6', E5', E4', E3', E2', E1', E0'} which will be written over elements E7–E0 in memory. Address register a3 points to the first element of this vector, namely E0. The process starts by executing an instruction, SVA.P, which is similar to the priming load instruction explained earlier (an example TIE code implementation is provided in Appendix D). This results in the alignment register being loaded with {X4, X3, X2, X1, X0, E2, E1}. Note that in this case we have discarded element E0 instead of element X4 as in the case of the LVA.P instruction.

The next instruction to be executed is the unaligned store instruction, SVS16A.IU (an example TIE code implementation of which is provided in Appendix E). This instruction will take X4–X0 from the alignment register, combine it with E2'–E0' from the vector register to form {X4, X3, X2, X1, X0, E2', E1', E0'}. This data is rotated on its way out (just as the load data was rotated on its way in), to become {E2', E1', E0', X4, X3, X2, X1, X0} and this is what is written to memory. Note that the old values E2–E0 were updated with the new values E2'–E0', while the values X4–X0 remain unchanged. Further, as part of the unaligned store operation, the alignment register gets updated with the value {E7', E6', E5', E4', E3', E2', E1'}, and the address register gets updated to point to the next vector in memory (starting at E8). Thus the next unaligned store instruction will combine E7'–E3' from the alignment register with E1'–E8' from the vector register to write the next vector to memory. From now on, there is a throughput of one unaligned store operation per instruction. At the very end, after the last unaligned store operation, there will be some elements left in the alignment register that need to be "flushed out" to memory. With reference to FIG. 6, this would be elements E63'–E59'. In one example of the present invention, a special instruction, SVA.F, known as the "store flush" instruction, is provided (an example TIE code implementation of which is attached in Appendix F). This instruction takes an alignment register and an address register as its input operand. If the address is not aligned to a 16-byte boundary, it does a partial store of the contents of the alignment register to memory—specifically in this case it will write elements E63'–E59' to memory. If on the other hand the address is aligned to a 16-byte boundary, the store flush instruction does nothing. Based on the above discussion, the following code sequence is one example of how to do a series of unaligned stores to memory:

| | | |
|---|---|---|
| SVA.P u0, a3 | | // Priming store (initialize |
| | | // alignment register) |
| LOOP a4, .Loop_end | | |
| ... | | // Compute the data to be stored |
| ... | | |
| SVS16A.IU v0, u0, a3, 16 | | // Unaligned store instruction |
| .Loop_end: | | |
| SVA.F u0, a3 | | // Store flush |

In a manner very similar to the unaligned load operation, the unaligned store implementation performs one unaligned store per instruction after the initial overhead of a single priming instruction, and the final flush instruction.

An improvisation over the above unaligned load/store implementation according to an alternative embodiment will now be described. Note in the above explanation of the unaligned store instruction that the two rightmost elements of the alignment register did not play any role in the execution of the instruction. Elements E2–E1 were loaded into these bits with the priming load, and were then overwritten by E2'–E1' of the unaligned store instruction. These would subsequently be overwritten by E10'–E9' and so on. Consider now that the alignment register is 128-bits wide instead of 112-bits. In this case, the three rightmost elements of the alignment register would not play any role in the execution of the unaligned store instruction—it would have contained elements E2–E0, E2'–E0' etc. which are never used. Note also from the explanation of the unaligned load instruction that these three elements are precisely the ones that get used for the LVS16A.IU instruction. The unaligned load implementation on the other hand does not use the leftmost elements of the alignment register, and these are precisely the elements that get used by the unaligned store instruction SVS16A.IU. Thus for any unaligned address, the load and store instructions use a complimentary set of bits in the alignment register. This means that if the alignment register is designed to be 128-bits wide, and only the relevant bits of the alignment register are updated by the unaligned load and store instructions, then the same alignment register can be used to load as well as store an unaligned stream of data. If the alignment register can be shared, it means that the processor needs fewer alignment registers, which results in cost savings in hardware. The size of the alignment registers is increased from 112-bits to 128-bits in this alternative embodiment, but since this reduces the total number of alignment registers required in the design, it is a worthwhile tradeoff. An example code sequence is given below that can be used to perform a "read-modify-write" operation on an array of unaligned vectors.

| | | |
|---|---|---|
| LVA.P | u0, a5 | // Priming Load for loads |
| SVA.P | u0, a6 | // Priming Load for stores |
| LOOP | a4, .Loop_end | |
| LVS16A.IU | v0, u0, a5, 16 | // Load unaligned vector |
| ADD20 | v0, v0, v1 | // Add a value to the vector |
| SVS16A.IU | v0, u0, a6, 16 | // Store unaligned vector |
| .Loop_end: | | |
| SVA.F | u0, a6 | // Flush alignment register |

Thus has been demonstrated a "symmetrical" unaligned load and unaligned store implementation that can share an alignment register, and can be used to very efficiently implement "read-modify-write" type operations on unaligned vector data.

This unaligned store implementation described above makes one assumption that may not be valid in certain systems. Note that the priming instruction SVA.P reads values X4–X0 from memory, and the first unaligned store instruction wrote the same values back to memory. This assumes that the memory contents of X4–X0 did not change between the time they were read by the SVA.P instruction and written by the SVS16A.IU instruction. If this is not true, then the SVS16A.IU instruction ends up corrupting memory. This could especially be a problem in a multi-processor system with shared memory, where making such assumptions could be dangerous. This is a disadvantage of this implementation.

What would be ideal for the unaligned store implementation is that the first unaligned store instruction does a partial store and only updates elements E2–E0 to E2'–E0'. It would not write any data to the locations X4–X0, in much the same way as the flush instruction does a partial store. Unfortunately this is harder to do than is obvious at first glance.

Note that the store flush is a separate instruction that is executed once at the end Of the instruction stream, and is outside the loop. What is needed now is that the store instruction, which is inside the loop, should behave differently during the first iteration of the loop (do a partial store) and in subsequent iterations of the loop (do a full store). One way to implement this behavior would be to "peel" the first iteration of the loop, and create a special store instruction that has the desired behavior. In this case, the code would look as follows:

```
...
...                                     // Compute data to be stored
Special_Partial_Store                   // Don't write X4-X0
LOOP    (a4-1), .Loop_end
...                                     // Compute the data to be stored
...
    SVS16A.IU v0, u0, a6, 16            // Unaligned store instruction
.Loop_end:
SVA.F   u0, a6                          // Store flush
```

The entire code segment inside the loop is repeated once outside the loop and the unaligned store instruction is replaced by the special instruction which does a partial store. The loop is then executed for (N−1) iterations. A disadvantage of this approach is that code size increases due to the peeling of the loop. In embedded processor applications, having a larger code size is a significant disadvantage and hence the above solution is not a good one.

The present invention provides a unique implementation that does not require the peeling of the loop and does a partial write in the first iteration of the loop, so as not to disturb the memory locations that should not be written. In this implementation, a "flag" bit is added and associated with each alignment register. Also, the priming instruction (for unaligned stores) is replaced with another instruction called ZALIGN (an example TIE code implementation of which is attached as Appendix G), which will set the alignment register contents along with the associated flag to 0. The new code sequence looks as follows:

```
ZALIGN u0                               // Set alignment register & flag to 0
LOOP   a4, .Loop_end
    ...                                 // Compute the data to be stored
    ...
    SVS16A.IU v0, u0, a6, 16            // Unaligned store instruction
.Loop_end:
SVA.F   u0, a6                          // Store flush
```

Every unaligned store instruction is now sensitive to the value of this flag. If the flag is 0, then the unaligned store instruction is executed as a partial store, based on the least significant bits of the address. In the first iteration of the loop, the flag is 0 because it was immediately preceded by the ZALIGN instruction. This causes the SVS16A.IU instruction in the first iteration of the loop to do a partial store to memory. Only the appropriate bits from the vector register (elements E2'–E0' in this example) are written to memory, and memory locations X4–X0 are untouched. Every unaligned store instruction sets the flag value to 1, so after the SVS16A.IU instruction of the first iteration is executed, the flag is set to 1. In the second (and subsequent) iterations, the flag is always set to 1, and hence the store is a full 128-bit store, combining the contents of the alignment register and vector register to generate the write data (elements E10'–E3' in the second iteration of this example).

In one embodiment of the current invention, the "flag" bit is implemented as bit 0 of the alignment register. Note that for unaligned stores, the least significant 16-bits of the alignment register are never used to store data (a fact that was exploited in a design where the alignment registers are only 112-bits wide). This makes it easy to associate the flag bit with the alignment register, and does not require adding any additional register bits to the design. The disadvantage is that no longer can 128 bits of the alignment register be available to store data, and hence the same alignment register cannot be shared between loads and stores. However it should be noted that this is not a fundamental limitation of the invention. It is easy to extend this idea to an implementation that uses all 128 bits of the alignment register to store data, thus allowing it to be shared for loads and stores, and allocate separate storage for the flag bit.

As set forth above, one can use the special alignment registers 212 when accessing data from unaligned locations in memory. Normally, this requires one alignment register per stream of data being accessed in memory. The design of this mechanism according to the present invention exploits the fact that complementary bits of the alignment register are used by load and store instructions. This allows for the same alignment register to be used for one stream of data being loaded from memory and another stream of data being stored to memory. This feature results in the reduction of the number of alignment registers required in the design, thus providing cost savings.

Further aspects of the select registers 214 in accordance with the invention will now be described. In this regard, it should be noted that while processing vector data in a SIMD fashion provides performance improvements, this approach also comes with its own unique challenges (as compared to scalar processing). One such challenge is that it is often necessary to rearrange the data in the vector register i.e. the order of the data elements in the register (after loading from memory) is not the order required for processing. Co-processor 204 of the present invention thus provides "select" and "dual select" instructions to address this issue. The select instruction takes two vector registers as its input and generates a single vector register as its output. Each element of the output register can be independently selected to be any of the sixteen elements of the two input registers. Thus this instruction allows arbitrary rearrangement of the elements of the input vectors into the output vector. The dual select instruction takes two input vector registers and generates two output vector registers, again allowing each element of the output vector to be any element of the input vector. TIE code for implementing an example select instruction is provided in Appendix H.

Figure 7:
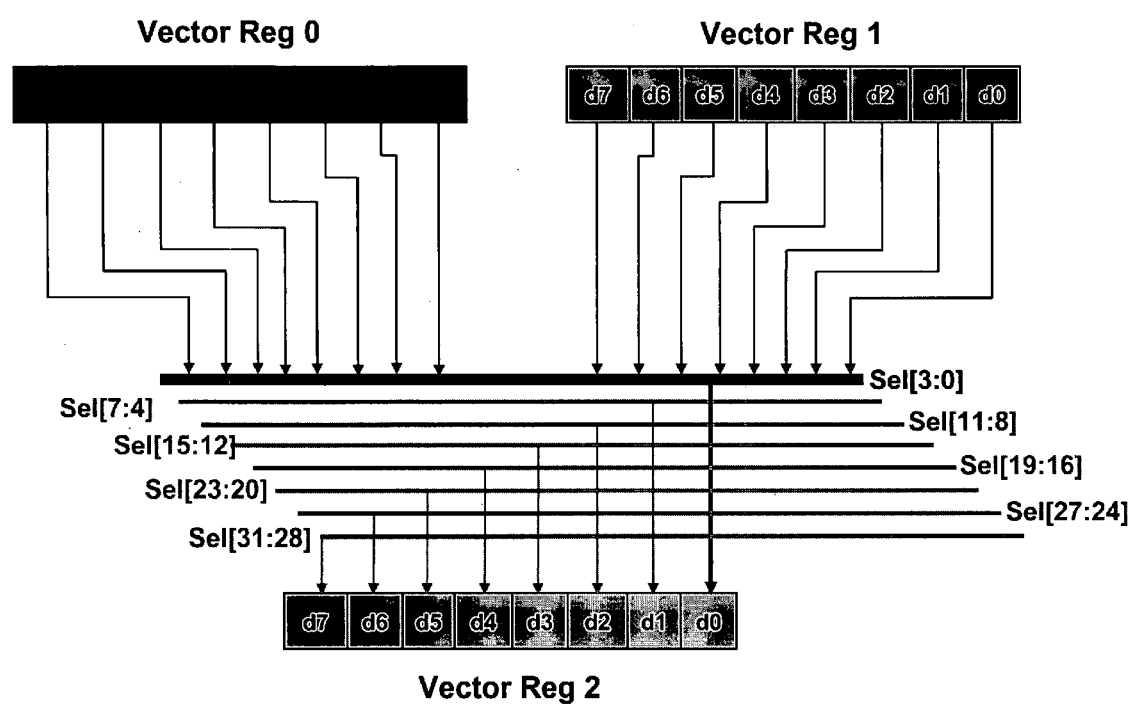
FIG. 7 is a diagram illustrating features of the select registers of the co-processor in accordance with an aspect of the invention.

As further illustrated in FIG. 7, the select instruction is used to rearrange data in a vector register. The selection control information is specified either as an immediate operand or using the select register file 214. The select register file allows arbitrary selection of data whereas the immediate format provides eight common selection control values to be used without the penalty of loading the select register file. The dual select instruction allows the data from the two input vectors to be rearranged into two result registers.

The inventive aspects of MAC unit 304 in accordance with the present invention will now be described in more detail. In this regard, it is first noted that most DSP algorithms perform a large number of "multiply—accumulate (MAC)" operations. This requires a multiplier, which is an expensive piece of hardware. Although each vector register 208 holds eight scalar values, there are only four multipliers in hardware (only one multiplier is shown in FIG. 3 for ease of illustration). Thus, in order to multiply all eight data values, one would need to issue two multiply instructions. This is illustrated in the code below:

```
MUL18.0    v0, v6, v7    // v0 <- even(v6) * even(v7)
MUL18.1    v1, v6, v7    // v1 <-  odd(v6) *  odd(v7)
```

In the above example, the MUL18.0 instruction multiplies the even elements of register v6 with the corresponding elements of register v7 and this result is stored in register v0. Similarly, the MUL18.1 instruction multiplies the odd elements of register v6 with the corresponding elements of register v7 and the result is stored in register v1. In one example, only four multipliers are provided in hardware, because multipliers are expensive. The penalty for this is that it takes two instructions and two cycles to compute the vector multiply result.

The present invention improves upon this situation by using an "iterative" multiply instruction. The ability to implement "iterative" instructions is described in more detail in the co-pending application Ser. No. 10/146,655. An iterative multiply instruction is a single instruction, that performs eight multiply operations over a period of two clock cycles, using four hardware multipliers. This instruction would be written as:

```
MUL18 v0:v1, v6, v7    // v0 <- even(v6) * even(v7)
                       // v1 <-  odd(v6) *  odd(v7)
```

In the first cycle, the four even data elements are multiplied, and in the next cycle the four odd elements are multiplied. Thus while the operation is similar to the MUL18.0 and MUL18.1 instruction combination mentioned earlier, this method allows only one instruction to be issued instead of two. Given that in most situations, one needs to compute all eight multiplication results, the iterative multiply instruction MUL18 (an example TIE code implementation of which is attached in Appendix I) provides an advantage over the pair of instructions MUL18.0 and MUL18.1. It allows the same amount of work to be done with half the number of instructions, which in turn means that less memory is needed to store the program code. This is a very important advantage in cost sensitive embedded applications.

The iterative multiply instruction provides another important advantage as follows. Recall that DSP algorithms perform a large number of multiply operations, and that multipliers are expensive to implement in hardware. Thus a DSP processor that can keep all the multipliers busy on every execution cycle can be thought of as an optimal implementation (highest achievable performance for the given amount of hardware). This goal is quite hard to achieve because there are typically other computations that have to be done besides the multiplication. For example, a FIR filter requires that the filter input data be shifted relative to the filter coefficients prior to each multiply accumulate operation. Consider the following code excerpt taken from an FIR filter implementation:

```
DSEL       v2:v3, v6, v2, s2    // shift input data by one
MULA18.0   v0, v2, v5           // multiply/accumulate even indices
MULA18.1   v1, v2, v5           // multiply/accumulate odd indices
DSEL       v2:v3, v3, v2, s2    // shift input data by one
MULA18.0   v0, v2, v7           // multiply/accumulate even indices
MULA18.1   v1, v2, v7           // multiply/accumulate odd indices
```

The above code excerpt uses the dual select (DSEL) instruction that was described above. In this particular case it is used to shift the input data by one element prior to each group of multiplications. The MULA18.0 and MULA18.1 instructions represent a multiply accumulate operation, in which the two input register operands are multiplied and the result accumulated in the result register. In every cycle that the processor executes a DSEL instruction, the multiplier hardware is idle. Thus, if one DSEL instruction is issued for every pair of multiply instructions, the multipliers are idle 33% of the time.

Now consider the use of iterative multiply instructions in this situation. As noted earlier, the issue of one iterative multiply instruction keeps the multiplier hardware occupied for two clock cycles. Thus, issuing an iterative multiply every other cycle achieves 100% utilization of the multipliers. Further, the iterative multiply instructions use the paired write port of vector register file 208, and this result is written to the register file after all eight multiplications are complete. As a result of this implementation, in the cycle immediately following an iterative multiply instruction, all processors resources except the multipliers are unused. One can thus schedule any non multiply instruction in this slot, and it "comes for free" in the sense that issuing this instruction does not reduce the multiplier hardware usage. With this in mind, the FIR kernel code excerpt can be recoded as shown below:

DSEL v2:v3, v6, v2, s2
MULA18 v0:v1, v2, v5
DSEL v2:v3, v3, v2, s2
MULA18 v0:v1, v2, v7

The sample code above thus illustrates that the presence of the iterative multiply instruction allows the processor to achieve a throughput of 4 MAC operations per instruction, which is the best that can be achieved with four multipliers in the hardware. It should be noted that the use of the DSEL instruction is just one example of how the "free" slot can be used. Since any non multiply instruction can be scheduled in this slot, the innovation allows for a vast array of DSP kernels to improve their MAC utilization by "hiding" some or all of their overhead processing in this slot. Referring back to FIG. 3, in one example implementation, the multiplier and multiplicand input operands of MAC unit 304 are 18-bit wide, fixed-point data values. This generates a 36-bit product, which is accumulated in a 40-bit accumulator. Since the multiply operation results in eight 40-bit elements, they are stored in two adjacent vector registers addressed by bits [3:1] of the result operand field. According to an aspect of the invention, MAC unit 304 provides four different "accumulation" options—no accumulation (multiply only), multiply/add, multiply/subtract, multiply and add ROUND register.

Figure 9:
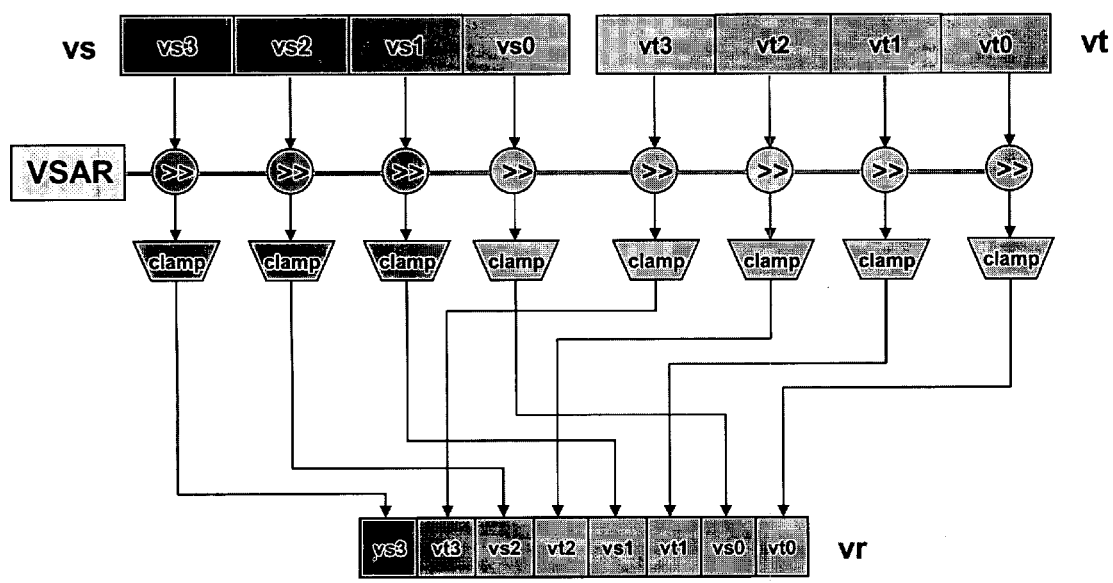
FIG. 9 is a diagram illustrating vector processor support for a PACK instruction according to the invention.

It is common practice in DSP algorithms to maintain the accumulator value in a higher precision format (as compared to the input data values), in order to reduce the amount of rounding error in the final result. However, at some point it is necessary to convert this higher precision data format back to the original precision of the input data, since the final results are expected in this format. Further, since the accumulator value is 40 bits wide, the results of the multiply are stored in two vector registers. One (e.g., register vs) stores the product of the four even elements of the input vector and the other (e.g., register vt) stores the product of the four odd elements of the input vector as illustrated in FIG. 9. While we can continue to accumulate values of subsequent MAC operations in these two separate accumulators, the final result needs to be in a format such that the odd and even elements are adjacent to each other.

The present invention provides a special instruction, labeled PACK, to convert the accumulator values back to the original input format (an TIE code implementation of an example PACK40 instruction is attached as Appendix J). As shown in FIG. 9 and mentioned above, vector register vt represents the four 40-bit accumulator values corresponding to the odd numbered elements and vector register vs corresponds to the four 40-bit accumulator values corresponding to the even numbered elements. First, the 40-bit values are shifted right by an amount equal to the contents of state register VSAR. This shifted value is then saturated (or clamped) to a 20-bit value. The eight 20-bit values are then interleaved to form a result vector (vr) which now contains the result in the desired format. The PACK40 instruction can be executed in a single cycle, and its presence is crucial for the effective use of the multiply instructions.

According to a preferred aspect of the invention, MAC unit 304 provides even further support for "complex" number multiplication. Many DSP applications (such as the Fast Fourier Transform) operate on complex numbers; numbers that have "real" and "imaginary" components. A complex number is represented as {a+jb} where "a" and "b" represent the real and imaginary parts of the number respectively. The product of two complex numbers, {a+jb} and {c+jd} is defined as the complex number {(ac−bd)+j(ad+bc)}.

On a typical microprocessor, complex number multiplication requires that the real and imaginary components be segregated into separate registers as a consequence of their different roles in complex arithmetic. Thus, in order to implement the above multiplication, four separate registers would be used as inputs to the computation, one each for the components "a", "b", "c" and "d." Many DSP algorithms involve "register-intensive" computations in the sense that the algorithm requires the availability of numerous data registers. An example of this would be the radix-four Fast Fourier Transform. Software pipelining of these algorithms is very difficult because of the high amount of "register-pressure." Thus, any technique that reduces the number of registers required in the computation would substantially ease the coding of this kernel.

The present invention addresses the above problem by providing special multiply instructions that operate upon complex numbers stored in an interleaved format. With reference to FIG. 10, the eight scalar elements of operand (vector) register 0 and 1 now represent four complex numbers, with their real and imaginary parts placed adjacent to each other. It may be noted that arithmetic operations such as addition and subtraction can be performed on complex numbers stored in an interleaved format using the same instructions as those used to operate upon real numbers. However, as explained earlier, multiplication of complex numbers is sufficiently different from the multiplication of real numbers that the real multiply instructions cannot directly be used to operate on this interleaved data storage format. MAC unit 304 provides a special complex multiply instruction, RMULA18 (an example TIE code implementation of which is attached as Appendix K), to accumulate the real part of the complex product into a vector of real elements (FIG. 10 real product register), and another complex multiply instruction, IMULA18, to accumulate the imaginary part of the complex product into a vector of imaginary elements (FIG. 10 imaginary product register).

Consider the RMULA 18 instruction that computes the real part of the complex product and accumulates this result in the destination register. This is also an iterative instruction that performs eight multiplies over a period of two cycles. With reference to FIG. 10, this instruction computes the four products a0c0, a1c1, a2c2 and a3c3 in the first cycle. These values are then added to the contents of the result register, which is the accumulator. In the next cycle, it computes the four products b0d0, b1d1, b2d2 and b3d3, and subtracts this value from the contents of the result register. We have thus performed the computation $$\text{accumulator=accumulator}+(ac-bd)$$

using the RMULA18 instruction. The IMULA18 instruction operates in a similar manner to compute the imaginary part of the complex product and accumulate the result in the accumulator register. The complex multiply instruction also provided the same four accumulation options as the real multiply instructions—no accumulation (multiply only), multiply/add, multiply/subtract, multiply and add ROUND register.

The availability of the complex multiply instructions thus allows storage of complex data in their natural, interleaved format. Such a scheme allows the computation of the complex product to use only two registers as inputs, in contrast to the four registers required in the absence of these instructions. The results of complex multiply instructions are stored in two separate registers—one containing the real component and the other the imaginary component. Further, these accumulator registers store data in the higher precision, 40-bit format. The PACK instruction described above can then be used to convert the real and imaginary accumulator registers back to the original, lower precision (20-bit), interleaved format complex number representation once all multiply accumulate operations are complete. Thus the complex multiply instructions, along with the PACK instruction, substantially eases the coding of register-intensive algorithms that operate on complex data type.

Even further efficiencies can be gained by exploiting the architecture of co-processor 204 in conjunction with the extensibility and configurability features of the co-pending and prior patent applications. In this regard, even further inventive aspects of ALU 306 in accordance with the present invention will now be described. For example, ALU 306 provides a few special ALU instructions to accelerate the performance of many DSP kernels on a vector processor. One such operation is reduction add, which adds all the elements of a single input vector operand to produce a scalar sum as the result. The scalar sum is then replicated into all the elements of the result vector. Another set of instructions is an extension of standard min and max instructions. In addition to selecting the minimum (or maximum) values into the result vector register, these instructions can also set flags in one or more Boolean registers to indicate which of the (two) input vector elements was the selected element.

Another special instruction is the "butterfly add" instruction. The Fast Fourier Transform (FFT) is an algorithm very frequently implemented on DSP processors. This algorithm requires the repeated computation of the sum and difference of the input data elements i.e. the computation of (a+b) and (a−b). This would typically be computed by issuing two separate instructions—an ADD and a SUBTRACT instruction on the same operands. The butterfly add instruction is a special instruction that computes both the above values in a single cycle. This improves code density and the run time performance of the FFT kernel when implemented on co-processor 204. The presence of this instruction also helps the FFT algorithm reach a higher number of "MAC operations per cycle", which as explained earlier is an important measure of a DSP processors efficiency. TIE code for implementing an example of a butterfly add instruction is provided in Appendix L.

The "multiply sign" instruction is another possible special instruction (an example TEE code implementation of which is attached as Appendix M). It is modeled after the "copy sign" operation used in floating point data manipulations. The scalar operation corresponding to this instruction is illustrated by the pseudo-code below:

if (input0 > 0) { // input operand 0 is positive
    result = input1;
    } else if (input0 < 0) { // input operand 0 is negative
    result = −input1;
    } else { // input operand 0 is zero
    result = 0;
    }

In addition, a preferred implementation of co-processor 204 provides a number of different ALU and shift instructions. Most of these instructions come in two flavors—one that operates on the 20-bit narrow register type and the other that operates on the 40-bit wide register type.

For example, add, subtract, minimum and maximum are the three operand arithmetic instructions supported. Two operand arithmetic instructions that generate the absolute value and the negated value of the input vector are also supported.

Logical AND, NAND, OR and Exclusive-OR operations are supported by the instruction set. Since these operators operate on a per bit basis (as opposed to on a narrow or wide scalar element), there is only one version of these instructions. Compare instructions are provided that compare the contents of two vector registers and update the Boolean registers based on the result of the comparison. The operators provided are less than, less than or equal and equal to.

In accordance with the state registers preferably provided in accordance with the invention, shift instructions come in two formats—one specifies the shift amount as a 5-bit immediate operand and the other uses the state register VSAR to specify the shift amount. This class of instructions provide left shift and arithmetic right shift operations.

Still further advantages can be obtained by exploiting the architectural features of the present invention and the co-pending applications. As is known, most modern day processors use pipelining techniques to achieve high performance. While pipelining does improve the performance of a processor, one of the well-known problems with pipelined processors is the stalling of the pipeline due to data hazards. For example, most DSP kernels are data intensive, and require fetching a large amount of data from memory. In most processor architectures, accessing data from memory takes more time than accessing data from registers. In situations where we need to load data from memory and then immediately operate upon that data, this creates a data hazard, and hence a "bubble" in the pipeline. The second instruction (that wants to process the data) has to wait for the first instructions (that loads the data) to complete and the load data to be available before it can be issued. The present invention addresses the above problem by "pushing down" the execution units to a later pipeline stage, so that they require their operands later in the execution pipeline. This implementation will now be described in more detail.

In a preferred implementation of the present invention, using the techniques described in more detail in co-pending application Ser. No. 10/146,651, co-processor 204 uses a 7-stage pipeline, where the stages are labeled H, I, R, E, L, M and W.

For example, consider the following code sequence in which a value is loaded into a vector register and then an instruction to negate that value is executed.

| LVS16.I | v0, a6, 0 | // v0 = Mem[a6 + 0] |
| NEG20 | v1, v0 | // v1 = v0 negated |

In the code, the NEG20 instruction is a "register to register" operation. It is a single cycle instruction in that the computation is performed in one cycle and the results are available in the next cycle. This computation would typically be performed in the E stage. The LVS16.I is a load instruction, whose address is generated in the E stage, the external memory uses the L stage to access the data, and it is presented back to the processor in the M stage. Because a vector load instruction requires some post processing (such as merging data with the alignment register), we need one additional cycle to complete the load. Thus the load data is available for use by a subsequent instruction only when the load instruction has reached the W stage.

In a typical pipeline implementation, the flow of these instructions would then be as follows (note that the H stage is omitted as it is not relevant to the discussion):

| Cycle | I | R | E | L | M | W |
|---|---|---|---|---|---|---|
| 1 | LVS16.I | | | | | |
| 2 | NEG20 | LVS16.I | | | | |
| 3 | | NEG20 | LVS16.I | | | |
| 4 | | NEG20 | * | LVS16.I | | |
| 5 | | NEG20 | * | * | LVS16.I | |
| 6 | | NEG20 | * | * | * | |
| | LVS16.I | | | | | |
| 7 | | | NEG20 | * | * | * |
| 8 | | | | NEG20 | * | * |
| 9 | | | | | NEG20 | * |
| 10 | | | | | | |
| | NEG20 | | | | | |

Note in the above figure that in cycle 4, although the LVS16.I instruction proceeded from the E to the L stage, the NEG20 instruction stalled in the R stage. This is because the NEG20 instruction uses the vector register v0 as its input operand, but the value of v0 is not available until the LVS16.I instruction goes through the W stage.

Such stalls are common in pipelined microprocessor implementations, and one way to get around them is for the programmer to schedule instructions such that they do not stall. In the above example, instead of scheduling the NEG20 instruction immediately after the load, the programmer could schedule three other unrelated instructions while the load instruction was fetching the data. If the NEG20 instruction came after these three instructions, there would be no wasted cycles due to stalls.

In many Digital Signal Processing (DSP) applications, the programmer is constrained by how fast he can issue load instructions to memory and use the results of the load. In these cases, it is usually not possible to reorder code to avoid the stall condition. Thus the performance of such code is substantially impacted by the 3 stall cycles between the LVS16.I and NEG20 instructions. The present invention includes a unique way to address this problem in coprocessor 204, which is designed to accelerate the performance of DSP code.

While most of the core processor 202 instructions read the register file in the R stage and execute the ALU operation in the E stage, the co-processor instructions have been "pushed" three cycles down in the pipeline stage. Thus co-processor 204 ALU instructions read the register file in the M stage and do the computation in the W stage. In the modified pipeline data flow diagram below, note that when the NEG20 instruction is in the M stage (when it needs to read the input operand), the LVS16.I instruction is in the W stage and the result of the load is indeed available. As a result of this change, there are no stalls between the LVS16.I and the NEG20 instruction.

| Cycle | I | R | E | L | M | W |
|---|---|---|---|---|---|---|
| 1 | LVS16.I | | | | | |
| 2 | NEG20 | LVS16.I | | | | |
| 3 | | NEG20 | LVS16.I | | | |
| 4 | | | NEG20 | LVS16.I | | |
| 5 | | | | NEG20 | LVS16.I | |
| 6 | | | | | NEG20 | |
| 7 | LVS16.I | | | | | |
|   | NEG20 | | | | | |

It should be noted that this change does not come for free. As a result of delaying the NEG20 computation by three cycles, the result of this computation becomes available three cycles later. Thus if there is a situation in which the NEG20 instruction was followed by an instruction to store the computed data to memory, the processor will now experience a stall, whereas previously it did not have one. This is illustrated by the following code sequence NEG20 v1, v0 //v1=v0 negated SVS16.1 v1, a6,0 //Mem[a6+0]=v1

| Cycle | I | R | E | L | M | W |
|---|---|---|---|---|---|---|
| 1 | NEG20 | | | | | |
| 2 | SVS16.I | NEG20 | | | | |
| 3 | | SVS16.I | NEG20 | | | |
| 4 | | SVS16.I | * | NEG20 | | |
| 5 | | | SVS16.I | * | NEG20 | |
| 6 | | | | SVS16.I | * | NEG20 |
| 7 | | | | | SVS16.I | * |
| 8 | | | | | | SVS16.I |

When the SVS16.I instruction is in the M stage, it needs to provide the store data. The store data comes from vector register v1, and this result is not available until the NEG20 instruction has gone past the W stage. Thus, in cycle 3, the SVS16.I instruction stalls in the R stage (stalls are always detected and enforced in the R stage) while the NEG20 instruction proceeds to the E stage.

Thus the stall condition is moved from the "load side" to the "store side" of the computation. Note that only a single cycle stall was incurred on the store, although a 3 cycle stall on the load was saved. Thus there is a net performance gain. Further, in most computations (and especially in DSP kernels), the number of loads is much larger than the number of stores. Thus removing the stall following the load and introducing one before the store improves the performance of the processor even if we did have to suffer a 3 cycle stall with the store.

It should be noted that the additional stall comes into play only when the ALU instruction is followed by a store, not when it is followed by another ALU instruction. All "register to register" ALU operations would read their input operand in the M stage and generate the result in the W stage. Thus there are no stalls in the case of back to back ALU instructions.

This technique of the present invention of pushing the execution unit to a later pipeline stage is thus an innovation that can provide significant performance advantages in program code that heavily relies on loading data from memory and immediately processing it.

Although the present invention has been particularly described with reference to the preferred embodiments thereof, it should be readily apparent to those of ordinary skill in the art that changes and modifications in the form and details may be made without departing from the spirit and scope of the invention. For example, those skilled in the art will understand that variations can be made in the number and order of processing steps illustrated in the above flow diagrams. It is intended that the appended claims include such changes and modifications.

What is claimed is:

1. A microprocessor comprising:
    a load/store unit that loads a first vector from a memory and stores a second vector to the memory, the first and second vectors having a vector size equal to an access width of the memory;
    a vector data register having a width equal to the vector size; and
    an alignment register accessible by the load/store unit and having a width smaller than the vector size, wherein when the first vector is not aligned to a word boundary corresponding to the vector size in the memory, the load/store unit is operable to combine one or more bits from the alignment register with one or more bits from memory to form the first vector loaded into the vector data register during a load operation, and when the second vector is not aligned to the word boundary in the memory, the load/store unit is further operable to combine one or more bits from the alignment register with one or more bits from the vector data register to form the second vector stored in memory during a store operation that is performed separately from the load operation.

2. A microprocessor according to claim 1, further comprising:
    an address register; and
    wherein the load/store unit is adapted to execute a priming load instruction having the alignment register and the address register as input operands, wherein the load/store unit determines if a memory address to the first vector in the address register is offset from a word boundary corresponding to the vector size, and only if the offset is non-zero, the load/store unit causes the alignment register to be initialized with memory contents from the memory address, the memory contents including a portion of the first vector, and the memory address in the address register is incremented by the vector size.

3. A microprocessor according to claim 2, wherein the load/store unit is adapted to execute an unaligned load instruction following the priming load instruction, during which the load/store unit combines the portion of the first vector from the alignment register with a remaining portion of the first vector from the next memory contents from the incremented memory address in the address register, and loads the combined vector into the vector data register.

4. A microprocessor comprising:
a load/store unit that loads a first vector from a memory and stores a second vector to the memory, the first and second vectors having a vector size equal to an access width of the memory;
a vector data register;
an alignment register accessible by the load/store unit, wherein when the first vector is not aligned to a word boundary corresponding to the vector size in the memory, the load/store unit is operable to combine one or more bits from the alignment register with one or more bits from memory to form the first vector loaded into the vector data register during a load operation, and when the second vector is not aligned to the word boundary, the load/store unit is further operable to combine one or more bits from the alignment register with one or more bits from the vector data register to form the second vector stored in memory during a store operation; and
an address register;
wherein the load/store unit is adapted to execute a priming store instruction having the alignment register and the address register as input operands, wherein the load/store unit determines if a memory address to the second vector in the address register is offset from the word boundary, and only if the offset is non-zero, the load/store unit causes the alignment register to be initialized with memory contents from the memory address, the memory contents including data that is not to be overwritten by a subsequent store operation to the same address.

5. A microprocessor according to claim 4, wherein the load/store unit is adapted to execute an unaligned store instruction following the priming store instruction, during which the load/store unit combines the data from the alignment register with the portion of the second vector from the vector data register, and stores the combination at the memory address.

6. A microprocessor according to claim 1, further comprising:
a flag associated with the alignment register;
an address register; and
wherein the load/store unit is adapted to execute an unaligned store instruction, wherein the unaligned store instruction causes the load/store unit to check the flag, and if the flag has a first setting, the load/store unit causes contents of the vector data register and the alignment register to be combined and the combined contents having the vector size to be written to a memory address in the address register, and if the flag has a second different setting, the load/store unit performs a partial write wherein only contents of the vector register in accordance with least significant bits of the memory address are caused to be written to the memory address.

7. A microprocessor comprising:
a load/store unit that loads and stores vectors from and to a memory, the memory having an access width that is equal to a vector size;
an alignment register accessible by the load/store unit and having a width equal to the vector size; and
a vector data register having a width equal to the vector size;
wherein the load/store unit is adapted to load a first stream of vectors from a first location in memory and to store a second stream of vectors to a second location in memory, the first and second locations both being offset by the same amount from first and second respective word boundaries corresponding to the vector size; and
the load/store unit uses complementary bits of the same alignment register during load and store operations for the first and second streams of vectors.

8. A microprocessor according to claim 1, further comprising:
an address register,
wherein the load/store unit is adapted to use the alignment register and the address register as input operands, and wherein the load/store unit determines if a memory address to the first vector in the address register is offset from a word boundary corresponding to the vector size, and only if the offset is zero, the load/store unit does not use any contents of the alignment register, and instead the first vector is formed entirely from memory contents at the memory address in the address register during the load operation.

* * * * *